(12) United States Patent
Pan

(10) Patent No.: US 7,702,939 B2
(45) Date of Patent: Apr. 20, 2010

(54) METHOD AND SYSTEM FOR CONTROLLING AN OPERATION TIME OF A COMPUTER

(75) Inventor: William Pan, Taipei (TW)

(73) Assignee: EBM Technologies Incorporated, Taipei (TW)

( * ) Notice: Subject to any disclaimer, the term of this patent is extended or adjusted under 35 U.S.C. 154(b) by 87 days.

(21) Appl. No.: 12/076,459

(22) Filed: Mar. 19, 2008

(65) Prior Publication Data

US 2009/0240861 A1 Sep. 24, 2009

(51) Int. Cl.
*G06F 1/00* (2006.01)

(52) U.S. Cl. ........................ 713/323; 710/262
(58) Field of Classification Search ................ 713/323, 713/502; 710/260, 262
See application file for complete search history.

(56) References Cited

U.S. PATENT DOCUMENTS

| | | | | | |
|---|---|---|---|---|---|
| 4,775,928 | A | * | 10/1988 | Kendall et al. | 713/310 |
| 5,041,964 | A | * | 8/1991 | Cole et al. | 713/322 |
| 5,053,943 | A | * | 10/1991 | Yokoyama | 713/502 |
| 5,454,114 | A | * | 9/1995 | Yach et al. | 713/330 |
| 5,666,541 | A | * | 9/1997 | Sellers | 713/324 |
| 5,842,028 | A | * | 11/1998 | Vajapey | 713/310 |
| 6,073,223 | A | * | 6/2000 | McAllister et al. | 711/167 |
| 6,089,456 | A | * | 7/2000 | Walsh et al. | 235/472.01 |
| 6,522,265 | B1 | * | 2/2003 | Hillman et al. | 340/988 |
| 6,579,209 | B1 | | 6/2003 | Valette et al. | |
| 6,760,634 | B2 | * | 7/2004 | Cook et al. | 700/82 |
| 7,321,788 | B2 | * | 1/2008 | Addy et al. | 455/574 |
| 7,406,446 | B2 | * | 7/2008 | Frank et al. | 705/52 |
| 7,538,669 | B2 | * | 5/2009 | Kashiwagi et al. | 340/539.16 |
| 2002/0146985 | A1 | * | 10/2002 | Naden | 455/70 |

* cited by examiner

*Primary Examiner*—Paul R Myers
(74) *Attorney, Agent, or Firm*—Rosenberg, Klein & Lee

(57) ABSTRACT

A method and system for controlling computer operation time is provided for counting how long the time for using the computer lasts. The steps of the time counting method are as following. First step is counting an operation time period for using the computer at the computer powered on; second step is determining the operation time period equal to a predetermined operating-time limit; third step is controlling the computer into an interrupted operating state when the operation time period is equal to the predetermined operating-time limit, wherein an interrupted time period for the computer stayed in the interrupted operating state is counted; fourth step is determining the interrupted time period equal to a predetermined suspension time; and fifth step is controlling the computer back to a normal operating state when the interrupted time period is equal to the predetermined suspension time, wherein the operation time period is re-counted.

29 Claims, 4 Drawing Sheets

METHOD AND SYSTEM FOR CONTROLLING AN OPERATION TIME OF A COMPUTER

BACKGROUND OF THE INVENTION

1. Field of the Invention

The present invention relates to a management of a computer operation and in particular to a method and system for controlling an operation time of a computer.

2. Description of Prior Art

The computer technology is developed increasingly so that computers are extremely common in office, classroom, and house. However, if a user lasts a long time for using the computer, for example, looking at monitor for a long time, operating mouse and keyboard repetitively or seating on the chair for a long time, the tendon and the sinew, the bone or the nerve of the eyes, the cervical vertebra, the lumbar vertebra and the wrist are easily got hurt. RSI (repetitive stress injuries) and CTS (carpal tunnel syndrome) are caused due to the improper computer use.

For preventing from the above injuries, ergonomics are now applied to the design of many elements of everyday life. However, the ergonomic environment for using the computer results in a longer time of computer use, the user works at computer keyboards without taking regular rest breaks. Doctors suggest that after working at the computer for one to two hours, the user have to rest for five to ten minutes so as to relieve the pressure on the human body and eyes.

From now on, the computer system is applied for a function of screensaver program so that the monitor is controlled to display a video after using for a certain time period. The lifetime of the monitor is increased because of reducing the use time of the monitor. Moreover, an issued patent, U.S. Pat. No. 6,579,209 disclosed a method for controlling a monitor to display a video of relieving body or eyes in a predetermined time. The user can follow the video to move body parts so as to reduce the pressure on the body. However the user can interrupt the display of the video on his demand, the effect of the mechanism is limited.

Therefore, in view of solving the computer-relative injures of children and people working at the computer, the inventor proposes the present invention to interrupt the operation of the computer to overcome the above problems based on his expert experience and deliberate research. The present invention can be employed widely on the computer in home, school and the public place.

SUMMARY OF THE INVENTION

The primary object of the present invention is to provide a method and system for controlling the operation time of a computer. By counting the time for using the computer, the computer is controlled into an interrupted operating state when the using time period is equal to the predetermined operating-time limit so that the user can take a break and prevent form the computer-related and negative effect.

In order to achieve the above object, the present invention provides a method for controlling the durative operation time of a computer, which is provided for counting how long the time for using the computer lasts. The steps of the time counting method are as following. First step is starting to count an operation time period of the computer as the computer is powered on; second step is comparing the operation time period with a predetermined operating-time limit; third step is setting the computer into an interrupted operating state when the operation time period is equal to the predetermined operating-time limit, and starting to count an interrupted time period for the duration of the computer staying in the interrupted operating state; fourth step is comparing the interrupted time period with a predetermined suspension time; and fifth step is restoring the computer back to its normal operating state when the interrupted time period is equal to the predetermined suspension time, and initializing the operation time period of the computer.

In order to achieve the above object, the present invention provides a method for controlling the operation time of a computer. The steps of the time counting mechanism are as following. First step is determining whether the starting time of the computer is in a preset interval or not as the computer is powered on; second step is setting the computer into its normal operating state when the starting time is not in the preset interval and staring to count an operation time period of the computer; third step is comparing the operation time period equal to a predetermined operating-time limit; fourth step is setting the computer into an interrupted operating state when the operation time period is equal to the predetermined operating-time limit, and starting to count an interrupted time period duration of the computer staying in the interrupted operating state; fifth step is comparing the interrupted time period with a predetermined suspension time; and final step is restoring the computer back to its normal operating state when the interrupted time period is equal to the predetermined suspension time, and initializing the operation tome period of the computer.

The present invention provides a system for controlling the operation time of a computer. The computer has an operating system and at least one peripheral. The time counting system comprises: an interrupt unit for controlling an interrupt request transmitted from the peripheral to the operating system; a program for controlling operation time (PCOT) of the computer installed inside the computer, wherein the PCOT of the computer is executed by the computer when the computer is powered on; wherein the PCOT of the computer counts the operation time period of the computer, and when the operation time period is equal to a predetermined operating-time limit, the PCOT of the computer controls the interrupt unit to mask the interrupt request transmitted from the peripheral to the operating system in order to set the computer into an interrupted operating state; wherein the PCOT of the computer counts the interrupted time period for the duration of the computer staying in the interrupted operating state, and when the interrupted time period is equal to a suspension time, the program controls the interrupt unit to remove the interrupt request transmitted from the peripheral to the operating system in order to restore the computer back to its normal operating state.

The present invention provides a system for controlling the operation time of a computer. The computer has an operating system and at least one peripheral. The time counting system comprises: an interrupt unit for controlling an interrupt request transmitted from the peripheral to the operating system; a device for controlling operation time (DCOT) of the computer coupled to the computer, wherein the device controls the computer to execute a PCOT of the computer when the computer is powered on; wherein the PCOT of the computer is provided for counting the operation time period of the computer, and when the operation time period is equal to a predetermined operating-time limit, the interrupt unit is controlled by the program for controlling operation time of the computer to mask the interrupt request transmitted from the peripheral to the operating system in order to set the computer into an interrupted operating state; wherein the PCOT of the computer is provided for counting the interrupted time period, when the interrupted time period is equal to a suspension time, the interrupt unit is controlled by the PCOT of the computer to remove the interrupt request transmitted from the peripheral to the operating system in order to set the computer back to its normal operating state.

In order to better understand the characteristics and technical contents of the present invention, a detailed description thereof will be made with reference to the accompanying drawings. However, it should be understood that the drawings and the description are illustrative but not used to limit the scope of the present invention.

DETAILED DESCRIPTION OF THE INVENTION

Figure 1:
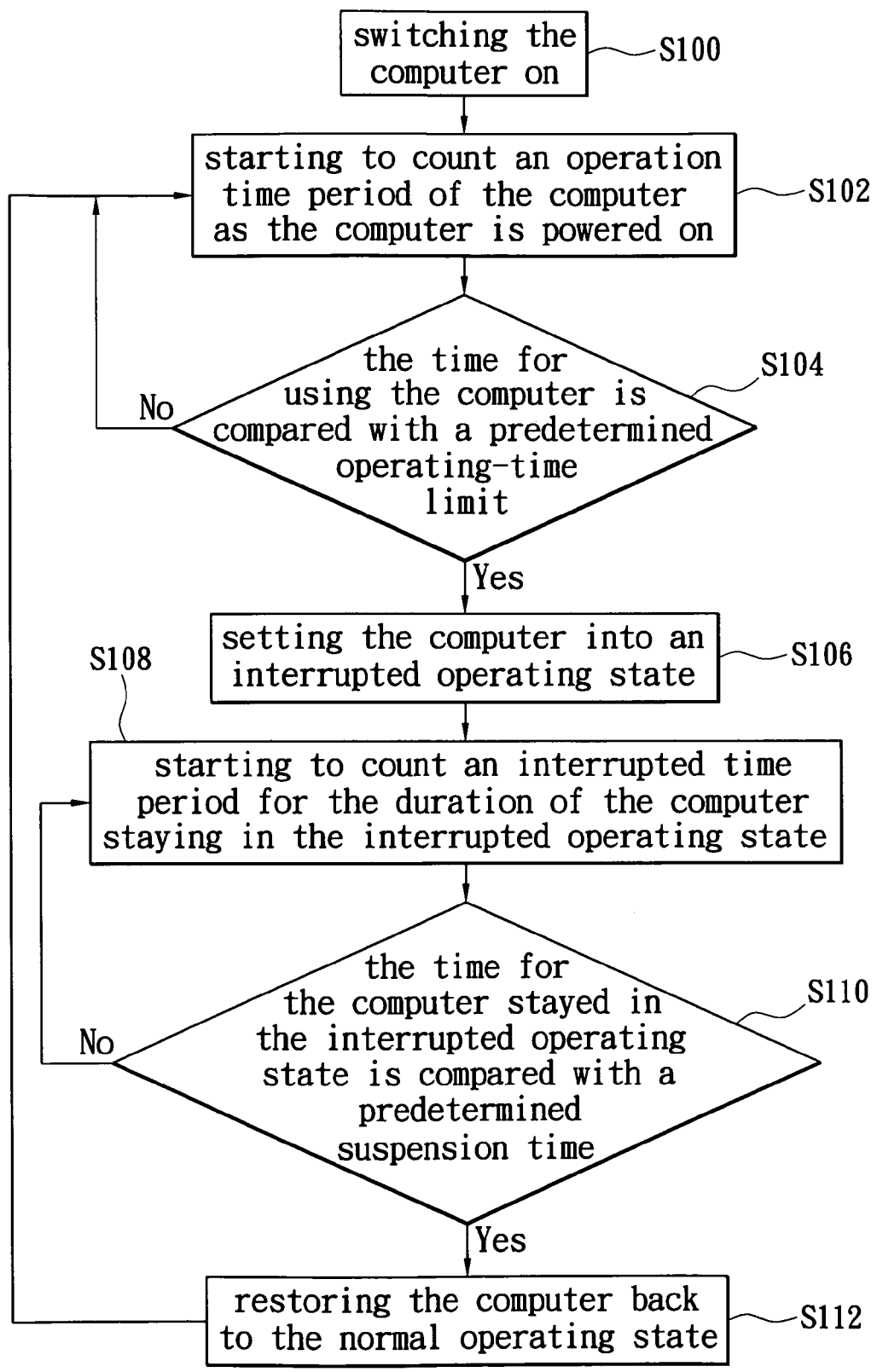
FIG. 1 is a flow chart showing the system for controlling the operation time of a computer according to the present invention.

The invention discloses a method and system for controlling the operation time of a computer. When a computer is used for some time, the mechanism is provided for controlling the computer into an interrupted operating state so as to coerce the user into taking a rest. In other words, the mechanism can prevent a user form the computer-related and negative effect on human because of using computers for a long time. Please refer to FIG. 1, in which the steps of time counting mechanism for a computer operation of the present invention are shown. The time counting mechanism for a computer operation is applied for counting how long using the computer continuously lasts. The method includes the following steps: providing a computer and switching the computer on is the first step (S100). Next, step S102 is starting to count an operation time period of the computer as the computer is powered on. Then the time for using the computer is compared with a predetermined operating-time limit (S104). Next, if the time for using the computer is equal to the predetermined operating-time limit, the computer is set to stay into an interrupted operating state (S106). Next step is starting to count an interrupted time period for the duration of the computer staying in the interrupted operating state (S108). Next the time for the computer stayed in the interrupted operating state is compared with a predetermined suspension time (S110). Depending on S110, the time for the computer stayed in the interrupted operating state is continuously counted if the time period is less than the predetermined suspension time. Alternatively, if the time period for the computer stayed in the interrupted operating state is equal to the predetermined suspension time, the computer is restored back to the normal operating state and the time for using the computer is initialized.

Figure 2:
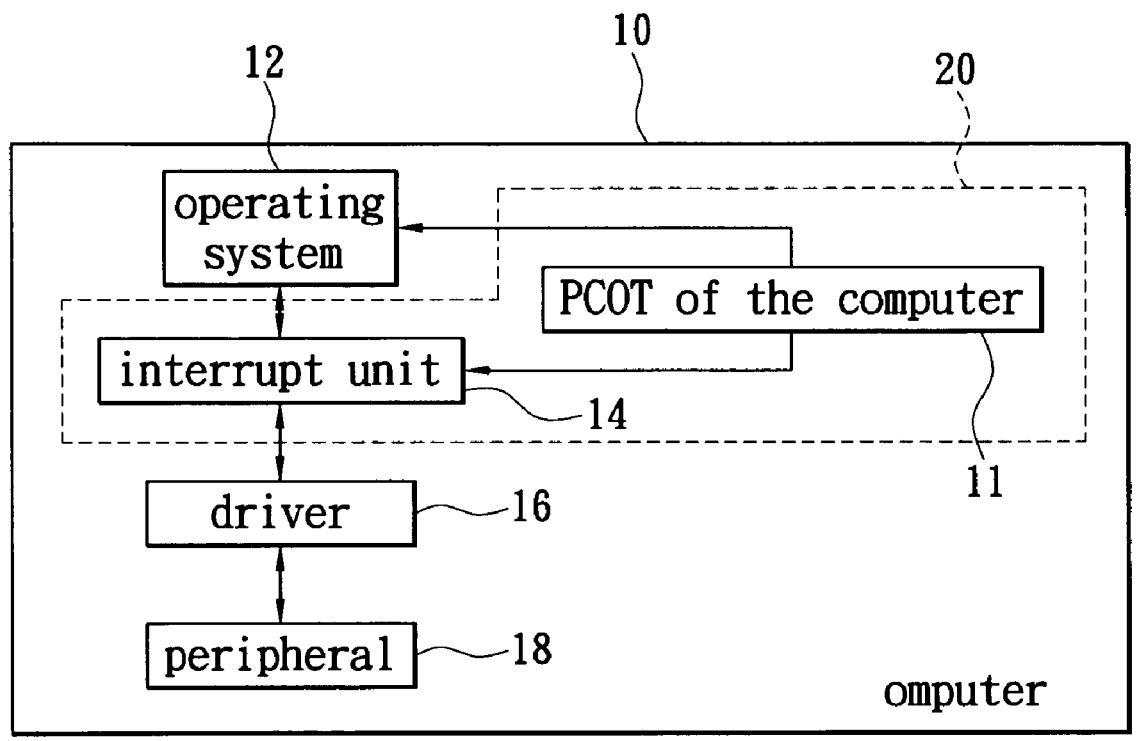
FIG. 2 is a schematic diagram showing the system for controlling the operation time of a computer according to the present invention.

As following, the practice model for executing the time counting mechanism for a computer operation is disclosed. Please refer to FIG. 2, an operating system (OS) 12 and a driver 16 is installed in the computer 10 and the computer 10 includes an accumulating system for operating time 20. The accumulating system for operating time 20 comprises a PCOT of the computer 11 and an interrupt unit 14 and the PCOT of the computer 11 is main mechanism for controlling the computer 10 to execute the controlling system of counting time. FIG. 2 is a simple illustration for showing the hardware and software of the computer 10, and the present invention can be achieved by a skilled person in this field. Moreover, the computer 10 comprises Central Processing Unit (CPU), memory unit, display unit and so on so that the operating system 12, the driver 16 and the accumulating system for operating time 20 can be executed and restored. Moreover, the executed result of the operating system 12, the driver 16 and the accumulating system for operating time 20 is shown on the display unit.

The driver 16 is installed and based on the operating system 12 so as to support the operation of peripheral 18, such as keyboard, mouse, and touch pad. General speaking, the computer 10 has at least one peripheral to input the command of a user. In FIG. 2, there is only one peripheral 18 but the present invention is not limited. When the peripheral 18 is enabled, the driver 16 outputs an interrupt request (IRQ) to control the operating system 12 so as to output a driving matter to response for the enabling of the peripheral 18. Accordingly, the operating system 12 can control the hardware and data transmission process.

The interrupt unit 14 comprises one or more than one of interruption controllers so that the interrupt requests inputted to the operating system 12 can be collected. Depending on the priority of the interrupt requests, the interrupt requests are controlled to input to the operating system 12 in sequence.

According to an embodiment of the present invention, the PCOT of the computer 11 is a resident program installed in the operating system 12. The PCOT of the computer 11 is executed when the computer 10 is turned on. Following the execution of the PCOT of the computer 11, an operating interface is displayed on the display unit so that a user can input the predetermined operating-time limit and the predetermined suspension time via the operating interface.

In the embodiment, the PCOT of the computer 11 counts the time and controls the operating and suspending time according to the predetermined operating-time limit and the predetermined suspension time. Each user of the computer 10 can respectively configures the predetermined operating-time limit and the predetermined suspension time. For example, the PCOT of the computer 11 can record a plurality of sets of the predetermined operating-time limit and the predetermined suspension time for multi users. The PCOT of the computer 11 latches the predetermined operating-time limit and the predetermined suspension time depending on the user name logged in the computer system and the time for using the computer is controlled by the PCOT of the computer 11.

The PCOT of the computer 11 is employed for counting how long the time for using the computer lasts. When the time-period for using the computer is equal to the predetermined operating-time limit, the interrupt unit 14 is controlled by the PCOT of the computer 11 to mask the interrupt request (IRQ) transmitted from the peripheral 18 to the operating system 12 so as to control the operating system 12 into a interrupted operating state. Next, the PCOT of the computer 11 is employed for counting how long the suspending time lasts. When the time-period for interruption of the computer is equal to the predetermined suspension time, the interrupt unit 14 is controlled by the PCOT of the computer 11 to remove the mask of the interrupt request (IRQ) transmitted from the peripheral 18 so that the computer is restored back to an operating state.

As mentioned above, when the time of a user for operating the computer is equal to the predetermined operating-time limit, the operating system 12 is controlled by the PCOT of the computer 11 to interrupt the operation of the computer and the interrupt request (IRQ) transmitted from the peripheral 18 is masked to disable the user to operate the computer so that the user is forced to take a rest.

When a person uses the computer 10, the person looks at the display unit (a monitor) to operate one or more computer program. The time of the person for operating the computer is equal to the predetermined operating-time limit, and the operating system 12 is controlled by the PCOT of the computer 11 to control the monitor into an idle mode. The monitor in the idle mode is closed so that the monitor is disabling to display frames and the user can take a rest. Alternatively, the monitor in the idle mode can display a predetermined stand-by picture. The stand-by display is a lighter picture or video to replace for a working display. The stand-by display is healthy for human eyes and can release the eye pressure and asthenopia.

Furthermore, the computer system can comprises one or more than one monitors. Accordingly, all monitor can be controlled into the idle mode. In other words, when a plurality of monitors is employed in the computer 10 and the computer 10 is into an interrupted operating state, all monitors are controlled into the idle mode.

In addition, a step for saving the executive work of the computer before the computer 10 is into an interrupted operating state so that the working data is prevented from losing. Another step for resuming the working data is executed at the time as the computer 10 is into an operation state.

A remaining interface is displayed on the monitor for noticing the user that the computer 10 will be into the interrupted operating state simply before the time for operating the computer is equal to the predetermined operating-time limit.

The mask of the interrupt unit 14 for masking the interrupt request (IRQ) that is transmitted from the peripheral 18 can be removed by an authorization of a hardware key. The hardware key is corresponding for the PCOT of the computer 11. Specifically speaking, if the hardware key is inserted into the computer 10 in the interrupted operating state, the interrupt request (IRQ) that is transmitted from the peripheral 18 can not be masked by the interrupt unit 14 so that the interrupt request can be transferred into the operating system 12. The operating system 12 can reply the interrupt request and the computer 10 is back to the operation state.

In the second embodiment, a device for controlling operation time (DCOT) of the computer is connected to the computer 10. The computer 10 is controlled by the DCOT of the computer to execute a PCOT of the computer 11 when the computer 10 is powered on. In this embodiment, the DCOT of the computer is a device with universal serial bus (USB) type and the DCOT of the computer can be inserted to couple to the computer 10. The operation of the DCOT of the computer is controlled by a firmware stored thereinside. A driver is installed in the computer 10 to support the operation of the DCOT of the computer. The computer 10 is controlled by the DCOT of the computer to execute the PCOT of the computer 11 for counting the operation time of the computer 10.

Figure 3:
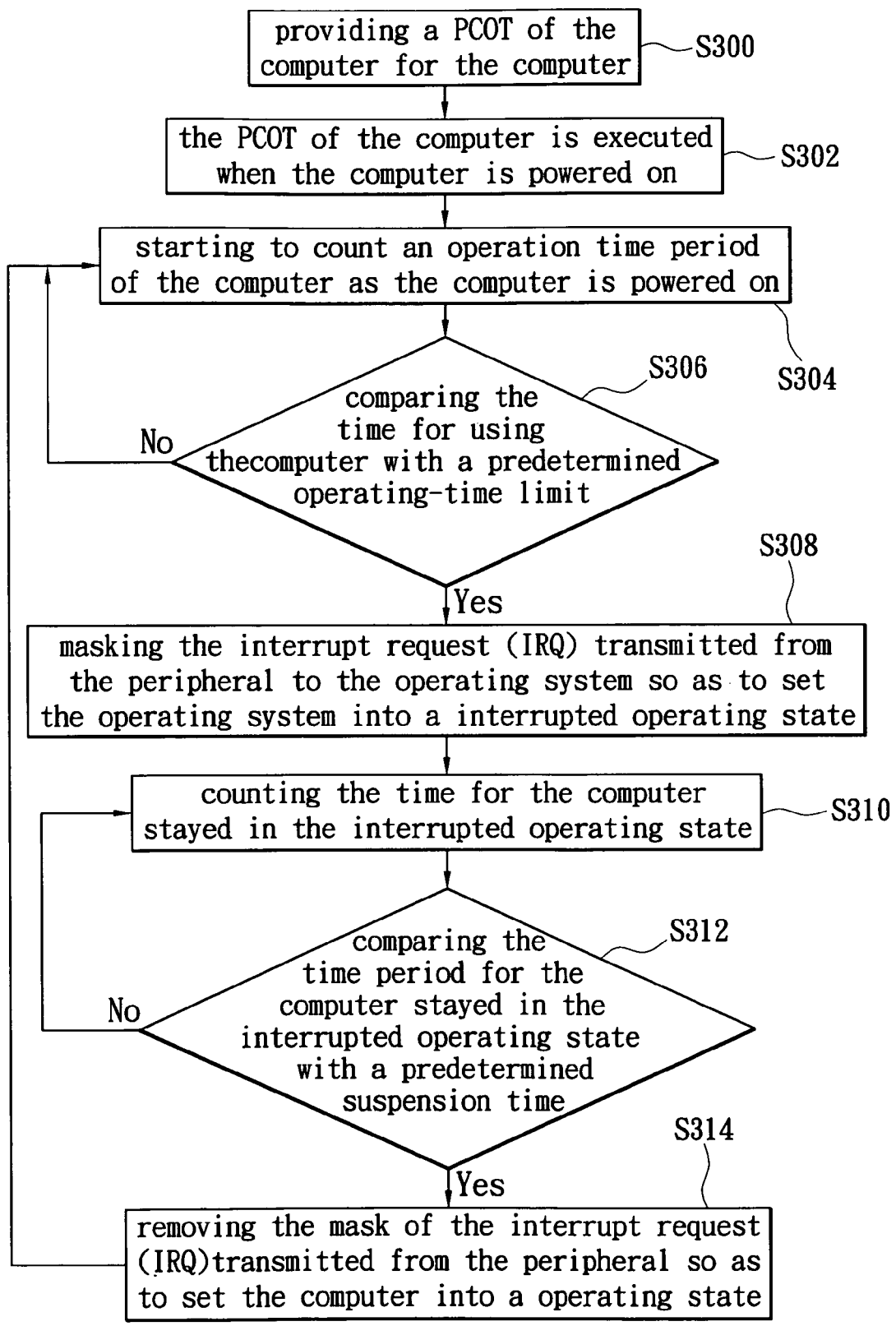
FIG. 3 is a flow chart showing the first embodiment of the method for controlling the operation time of a computer according to the present invention.

In addition, please refer to the FIG. 3, the figure is shown a chart of the embodiment for controlling the computer in accordance with the FIG. 2. The method comprises the following steps.

First, the PCOT of the computer 11 is provided for the computer 10 (S300). Next, the PCOT of the computer 11 is executed when the computer 10 is powered on (S302).

Next, starting to count an operation time period of the computer as the computer 11 is powered on (S304).

Then, the time for using the computer is compared with a predetermined operating-time limit by the PCOT of the computer 11 (S306).

The time for using the computer is not equal to a predetermined operating-time according to the result of the step S306, and the time for using the computer is continuously counted.

Alternatively, the time for using the computer is equal to a predetermined operating-time according to the result of the step S306, and the interrupt unit 14 is controlled by the PCOT of the computer 11 to mask the interrupt request (IRQ) transmitted from the peripheral 18 to the operating system 12 so as to control the operating system 12 into a interrupted operating state (S308).

Next, the interrupted time period of the computer 10 is counted (S310).

Next, the time for the computer stayed in the interrupted operating state is compared with a predetermined suspension time (S312).

The time for interrupting the computer is not equal to a predetermined operating-time according to the result of the step S312, and the time for interrupting the computer is continuously counted. Alternatively, the time for interrupting the computer is equal to a predetermined operating-time according to the result of the step S312, and the interrupt unit 14 is controlled by the PCOT of the computer 11 to remove the mask of the interrupt request (IRQ) transmitted from the peripheral 18 so as to control the computer 10 into a operating state (S314). Furthermore, the system is back to S304 so that the time of the person for operating the computer is counted.

The system for controlling computer operation time further includes providing a DCOT of the computer for coupling to the computer 10 before the step S300. The computer 10 is controlled by the DCOT of the computer to execute the PCOT of the computer 11 so as to count the time for using the computer 10.

The computer 10 can be controlled by the PCOT of the computer 11 so that the computer 10 can be the interrupted operating state in a preset interval. For example, if an administrator rules that using the computer at noon or at night is forbidden, the administrator can execute the interface of the PCOT of the computer 11 to input the starting timing and an ending timing of the interrupted operating state. Accordingly, the computer 10 can be used in the preset interval between the starting timing and an ending timing of the interrupted operating state. The PCOT of the computer 11 is provided for judging the time of the computer 10 in or out of the preset interval. When the time of the computer 10 is in the preset interval, the computer 10 is controlled to in the interrupted operating state by the PCOT of the computer 11.

Figure 4:
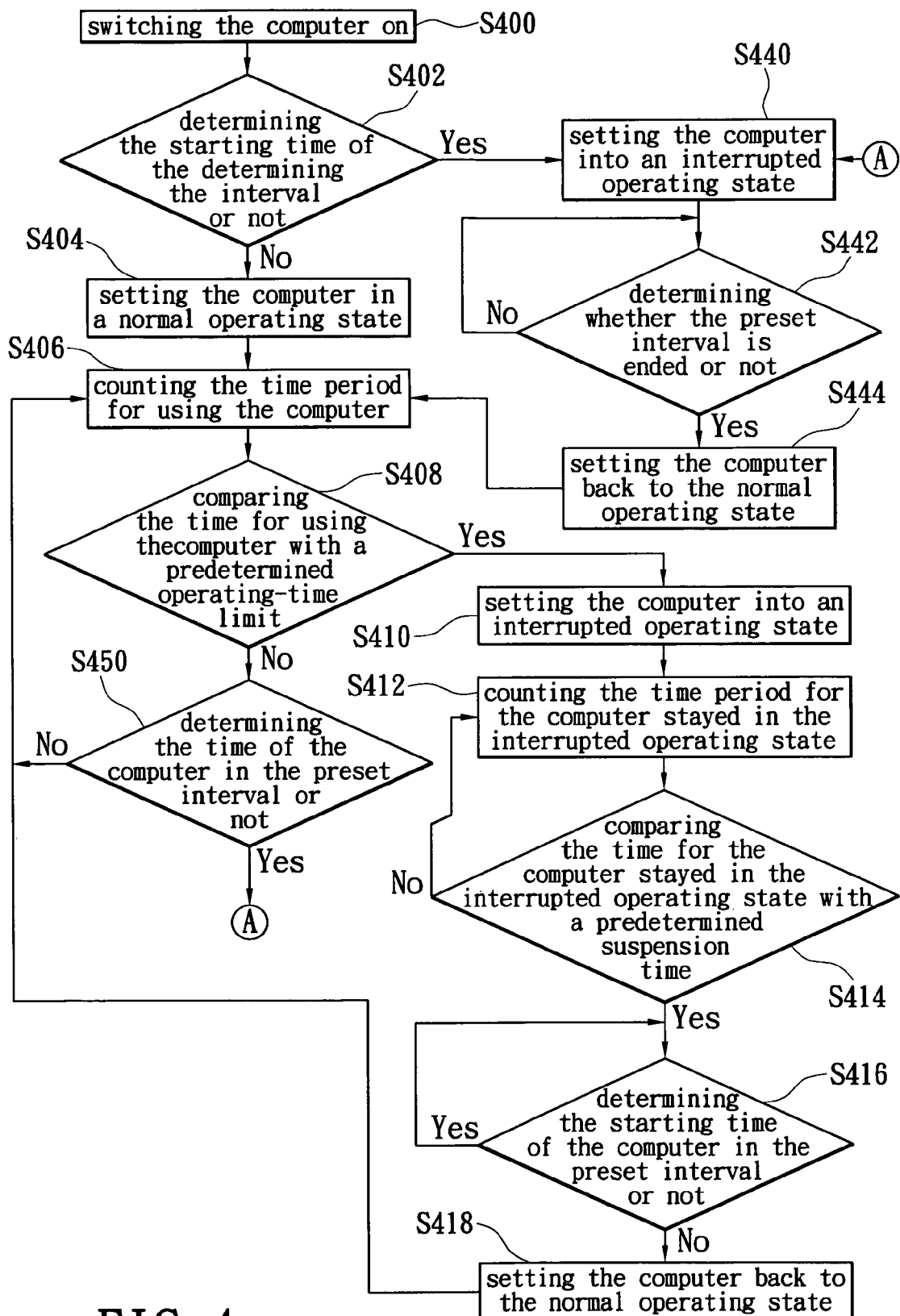
FIG. 4 is a flow chart showing the second embodiment of method for controlling the operation time of a computer according to the present invention.

Please refer to FIG. 4, the flow chart of the method for controlling computer operation time is shown. The method includes the following steps.

The computer 10 is powered on (S400).

Next, the starting time of the computer 10 is determined in the preset interval or not (S402).

If the time of the computer 10 is out of the preset interval according to the result of the step S402, the computer 10 will be in the normal operating state (S404).

And then, the time period for using the computer is counted (S406).

Next, Then the time period for using the computer is compared with a predetermined operating-time limit (S408).

According to the result of the step S408, if the time period for using the computer is not equal to a predetermined operating-time limit, the starting time of the computer 10 is determined in the preset interval or not (S450).

According to the result of the step S450, if time of the computer 10 is out of the preset interval, the time for using the computer is counted.

Alternatively, according to the result of the step S408, if the time for using the computer is equal to a predetermined operating-time limit, the computer 10 is set to stay into an interrupted operating state (S410).

Next step is counting the time period for the computer stayed in the interrupted operating state (S412).

Next the time period for the computer stayed in the interrupted operating state is compared with a predetermined suspension time (S414).

According to the result of the step S414, if time period is not equal to the predetermined suspension time, the time period for the computer stayed in the interrupted operating state is continuously counted.

Alternatively, if time period is equal to the predetermined suspension time according to the result of the step S414, the starting time of the computer 10 is determined in the preset interval or not (S416).

According to the result of the step S416, if starting time of the computer 10 is out of the preset interval, the computer 10 is back to the normal operating state and the time period for using the computer is initialized (S418).

Further, if the starting time of the computer 10 is in the preset interval according to the result of the step S402, the computer 10 is set to stay into an interrupted operating state (S440).

Next, the operating time of the computer is determined to be out of the preset interval (S442), the computer 10 is back to the normal operating state (S444) and the time for using the computer is re-counted (S406).

In addition, according to the result of the step S450, if time of the computer 10 is in the preset interval, the computer 10 is set to stay into an interrupted operating state (S440). The computer 10 is restored back to the normal operating state when the time is out of the preset interval.

As mentioned above, the efficiency for controlling the time of computer user is improved.

To sum up, the present invention is direct to a time counting mechanism for a computer operation. When the time for using the computer is equal to the predetermined operating-time limit, the computer will be into an interrupted operating state. The computer will back to the normal operating state, until the time for the computer stayed in the interrupted operating state is equal to a predetermined suspension time. The user can take a break and prevents form the computer-related and negative effects.

Although the present invention has been described with reference to the foregoing preferred embodiment, it will be understood that the invention is not limited to the details thereof. Various equivalent variations and modifications may occur to those skilled in this art in view of the teachings of the present invention. Thus, all such variations and equivalent modifications are also embraced within the scope of the invention as defined in the appended claims.

What is claimed is:

1. A method for controlling an operation time of a computer comprising the steps of:
   starting to count an operation time period of the computer having an operating system installed therein and at least one peripheral connected thereto as the computer is powered on;
   comparing the operation time period with a predetermined operating-time limit;
   setting the computer into an interrupted operating state when the operation time period is equal to the predetermined operating-time limit, and starting to count an interrupted time period for a duration of the computer staying in the interrupted operating state, and masking an interrupt request transmitted from the peripheral to the operating system via a mask;
   comparing the interrupted time period with a predetermined suspension time; and
   restoring the computer back to its normal operating state when the interrupted time period is equal to the predetermined suspension time, and initialing the operation time period of the computer.

2. The method according to claim 1, wherein the step of restoring the computer back to its normal operating state further comprises a step of removing the mask of the interrupt request (IRQ) transmitted from the peripheral.

3. The method according to claim 1, wherein the step of setting the computer into the interrupted operating state further comprises a step of saving an executive work of the computer.

4. The method according to claim 3, wherein the step of restoring the computer back to its normal operating state further comprises a step of resuming the executive work of the computer before the computer is set into the interrupted operating state.

5. The method according to claim 1, wherein the computer comprises at least one display unit, and the step of setting the computer into the interrupted operating state further comprises a step of setting the display unit into an idle mode.

6. The method according to claim 1, wherein the computer has a program for controlling computer operation time installed therein, the step of starting to count the operation time period of the computer further comprises a step of executing a program for controlling operation time(PCOT) of the computer for counting the operation time period of the computer.

7. The method according to claim 6, wherein the mask of the interrupt request (IRQ) of the peripheral is able to be removed by an authorization.

8. The method according to claim 7, wherein the authorization is provided via a hardware key.

9. The method according to claim 1, further comprising a step:
   providing a device for controlling operation time (DCOT) of the computer for controlling computer operation time coupled to the computer,
   wherein the step of starting to count operation time period of the computer includes the step of the device driving the computer to execute a program for counting computer operation time for counting the operation time period of the computer.

10. The method according to claim 1, further comprising following steps:
    determining whether the operating time of the computer is in a predetermined suspension time or not; and
    setting the computer into the interrupted operating state if the operating time of the computer is in the predetermined suspension time.

11. A method for controlling an operation time of a computer comprising the steps of:
    as the computer is powered on, determining whether the starting time of the computer is in a predetermined operation time or not, wherein the computer comprises an operating system installed therein and at least one peripheral connected thereto;
    if the starting time is not in the predetermined operation time, setting the computer into its normal operating state and starting to count an operation time period of the computer;
    comparing the operation time period equal with a predetermined operating-time limit;
    setting the computer into an interrupted operating state when the operation time period is equal to the predetermined operating-time limit, and starting to count an interrupted time period for the duration of the computer staying in the interrupted operating state, and masking an interrupt request transmitted from the peripheral to the operating system via a mask;

comparing the interrupted time period with a predetermined suspension time; and restoring the computer back to its normal operating state when the interrupted time period is equal to the predetermined suspension time, and initializing the operation tome period of the computer.

12. The method according to claim 11, wherein if the starting time of the computer is in the predetermined suspension time as the computer is powered on, the computer is set into the interrupted operating state, and the computer is restored back to its normal operating state when the preset interval ends.

13. The method according to claim 11, further comprising following steps:

comparing the operating time of the computer with the predetermined suspension time;

if the operating time of the computer is in the predetermined suspension time, setting the computer into the interrupted operating state; and restoring the computer back to its normal operating state when the predetermined suspension time ends, and initializing the operation time period of the computer.

14. The method according to claim 13, wherein the step of restoring the computer back to its normal operating state further comprises a step of removing the mask of the interrupt request (IRQ) transmitted from the peripheral.

15. The method according to claim 13, wherein the step of setting the computer into the interrupted operating state further comprises a step of saving the executive work of the computer.

16. The method according to claim 15, wherein the step of restoring the computer back to its normal operating state further comprises a step of resuming the executive work of the computer before the computer is set into the interrupted operating state.

17. The method according to claim 13, wherein the computer comprises at least one display unit, and the step of setting the computer into the interrupted operating state further comprises a step of setting the display unit into an idle mode.

18. The method according to claim 13, wherein the computer has a program for controlling operation time (PCOT) of the computer for controlling computer operation time installed thereinside, the step of starting to count the operation time period of the computer further comprises a step of executing the PCOT of the computer for counting the operation time period of the computer.

19. The method according to claim 18, wherein the mask of the interrupt request (IRQ) of the peripheral is able to be removed by an authorization.

20. The method according to claim 19, wherein the authorization is provided via a hardware key.

21. The method according to claim 13, further comprising a step:

providing a device for controlling operation time (DCOT) of the computer for controlling computer operation time coupled to the computer, wherein the step of starting to count operation time period of the computer includes the step of the device driving the computer to execute a program for counting computer operation time for determining whether the operating time of computer is in the preset interval or not.

22. A system for controlling an operation time of a computer comprising:

an interrupt unit for controlling an interrupt request transmitted from the peripheral to the operating system;

a for controlling operation time of the computer installed inside the computer, wherein the program is executed by the computer when the computer is powered on wherein the PCOT of the computer counts the operation time period of the computer, and when the operation time period is equal to a predetermined operating-time limit, the PCOT of the computer controls the interrupt unit to mask the interrupt request transmitted from the peripheral to the operating system in order to set the computer into an interrupted operating state;

wherein the PCOT of the computer counts an interrupted time period for the duration of the computer staying in the interrupted operating state, and when the interrupted time period is equal to a suspension time, the program controls the interrupt unit to remove the interrupt request transmitted from the peripheral to the operating system in order to restore the computer back to its normal operating state.

23. The system according to claim 22, wherein the computer comprises at least one display unit, and the program controls the operating system for controlling operation time of the computer to set the display unit into an idle mode.

24. The system according to claim 22, wherein a mask for the interrupt request (IRQ) of the peripheral is able to be removed by an authorization.

25. The system according to claim 24, wherein the authorization is provided by a hardware key coupled to the computer.

26. A system for controlling an operation time of a computer comprising:

an interrupt unit for controlling an interrupt request transmitted from the peripheral to the operating system;

a device for controlling operation time (DCOT) of the computer coupled to the computer, wherein the device controls the computer to execute a PCOT of the computer when the computer is powered on;

wherein the PCOT of the computer is provided for counting an operation time period of the computer, and when the operation time period is equal to a predetermined operating-time limit, the program controls the interrupt unit to mask the interrupt request transmitted from the peripheral to the operating system in order to set the computer into an interrupted operating state;

wherein the PCOT of the computer is provided for counting an interrupted time period for the duration of the computer staying in the interrupted operating state, when the interrupted time period is equal to a suspension time, the program controls the interrupt unit to remove the interrupt request transmitted from the peripheral to the operating system in order to restore the computer back to its normal operating state.

27. The system according to claim 26, wherein the computer comprises at least one display unit, and the program controls the operating system to set the display unit into an idle mode.

28. The system according to claim 26, wherein a mask of the interrupt request (IRQ) of the peripheral is able to be removed by an authorization.

29. The system according to claim 28, wherein the authorization is provided by a hardware key coupled to the computer.

* * * * *